United States Patent [19]

Enami et al.

[11] Patent Number: 5,948,850
[45] Date of Patent: Sep. 7, 1999

[54] THERMOPLASTIC ELASTOMER COMPOSITION FOR POWDER SLUSH MOLDING AND PROCESS FOR PREPARATION OF SAID COMPOSITION

[75] Inventors: Hirohide Enami, Akash; Kenro Ono; Kastuyuki Hioki, both of Hyogo, all of Japan

[73] Assignee: Mitsuboshi Belting Ltd., Hyogo, Japan

[21] Appl. No.: 08/869,670

[22] Filed: Jun. 5, 1997

[30] Foreign Application Priority Data

Jun. 6, 1996 [JP] Japan ................................. 8-168259
Oct. 23, 1996 [JP] Japan ................................. 8-299617

[51] Int. Cl.⁶ .............................. C08J 53/02; C08K 5/01
[52] U.S. Cl. ............................ 524/515; 524/505; 525/95
[58] Field of Search ................................. 524/500, 505, 524/515; 525/95

[56] References Cited

U.S. PATENT DOCUMENTS 5,596,042   1/1997   Itoh et al. ................................. 525/98

*Primary Examiner*—Robert Dawson
*Assistant Examiner*—D. Aylward
*Attorney, Agent, or Firm*—Wood, Phillips, VanSanten, Clark & Mortimer

[57] ABSTRACT

A thermoplastic elastomer composition for powder slush molding made up of a polypropylene resin, hydrogenated styrene/butadiene rubber, a process oil and an elastomer excellent in oil absorbing power. A process for making that thermoplastic elastomer composition may include the addition of an organic peroxide to the above components and kneading the obtained mixture while heating.

26 Claims, No Drawings

THERMOPLASTIC ELASTOMER COMPOSITION FOR POWDER SLUSH MOLDING AND PROCESS FOR PREPARATION OF SAID COMPOSITION

BACKGROUND OF THE INVENTION

1. Field of the Invention

This invention relates to a thermoplastic elastomer composition for powder slush molding and a process for the preparation of that composition. More specifically, the invention relates to a thermoplastic elastomer composition having a high degree of fluidity in a powdery state and a low melt viscosity, and which may enable the easy release of a molded skin from a mold.

2. Background Art

Powder slush molding processes are widely employed in the automotive industry to form the skins of instrument panels, console boxes, door trims, and other interior trims in automobiles. The skins are soft to the touch, allow for leather graining and stitching, and permit great design freedom. Unlike injection or compression molding, no pressure is applied for shaping in powder molding processes. Therefore, the powdery material for powder slush molding ideally should not only have a high degree of fluidity in the powdery state so as to attain the uniform adhesion of the material to a mold having a complicated shape, but should also exhibit a low melt viscosity so that it can be molten and fluidized without pressing to form a film. Furthermore, it is desirable that the skin layer formed on a mold release easily from the mold after cooling.

A powder material composition designed to meet these goals has been proposed in Japanese Pat. Appln. Laid-Open Gazette No. Hei 7-82433. Disclosed therein is a powder slush molding material prepared by pulverizing a mixture made up of a polypropylene resin and a specified styrenic thermoplastic elastomer at a weight ratio between 70:30 and 30:70. The styrenic thermoplastic elastomer is chosen from among styrene/ethylene/butylene/styrene block copolymers, styrene/ethylene/propylene/styrene block copolymers, and hydrogenated styrene/butadiene rubbers, with all having a styrene content of no more than 20% by weight. Compositions with each of these elastomers are suitable for powder molding.

However, the composition made up of the polypropylene resin and a hydrogenated styrene/butadiene rubber is particularly problematic in that the oligomeric component contained in the composition bleeds to the surface because of the poor oil absorbing power of the hydrogenated styrene/butadiene rubber. This makes the composition sticky, causing aggregation and poor fluidity in the powdery state. This also makes it difficult to release skins from molds.

SUMMARY OF THE INVENTION

The present invention has as one of its objectives to solve the above problems by providing a thermoplastic elastomer composition for powder slush molding which makes possible excellent melt flow properties suitable for powder molding, a low melt viscosity, and the facilitated release of a molded skin from a mold. The present invention is also directed to a process for the preparation of such a composition.

In one form of the invention, a thermoplastic elastomer composition is provided for powder slush molding which made up of a polypropylene resin, a hydrogenated styrene/butadiene rubber, a process oil, and an elastomer excellent in oil absorbing power.

In one form, the thermoplastic elastomer composition has a melt flow rate of at least 5 g/10 min as determined according to JIS K-7210 at 250° C. under a load of 0.325 kgf In one form, the weight ratio in the composition of the polypropylene resin to the hydrogenated styrene/butadiene rubber is between 80:20 and 20:80.

The elastomer excellent in oil absorbing power may be mixed in the composition in an amount of 20 to 250 parts by weight per 100 parts by weight of the hydrogenated styrene/butadiene rubber.

In one form, the elastomer excellent in oil absorbing power is selected from among styrene/ethylene/propylene/styrene block copolymers, styrene/ethylene/butylene/styrene block copolymers, crystalline olefin/ethylene/butylene/crystalline olefin block copolymers, ethylene/propylene rubbers, and ethylene/octene copolymers.

In one form, the process oil is mixed in the composition in an amount of 5 to 200 parts by weight per 100 parts by weight of the elastomer excellent in oil absorbing power.

In one form of the invention, a thermoplastic elastomer composition is provided for powder slush molding which is made up of a polypropylene resin, a hydrogenated styrene/butadiene rubber, a process oil, an elastomer excellent in oil absorbing power, and an organic peroxide.

The thermoplastic elastomer composition may be made up of a polypropylene resin, a hydrogenated styrene/butadiene rubber, a process oil, and an elastomer excellent in oil absorbing power. The composition may be formed by preparing a blend of the polypropylene resin and the hydrogenated styrene/butadiene rubber at a weight ratio between 80:20 and 20:80, adding an elastomer excellent in oil absorbing power to the blend in the amount of 20 to 250 parts by weight per 100 parts by weight of the hydrogenated styrene/butadiene rubber, adding a process oil to the blend in the amount of 5 to 200 parts by weight per 100 parts by weight of the elastomer excellent in oil absorbing power, kneading and pelletizing the resulting composition, and pulverizing the obtained pellets either at ambient temperature or in a frozen state.

In one form, a process for the preparation of a thermoplastic elastomer composition, according to the invention, includes the steps of adding a hydrogenated styrene/butadiene rubber, a process oil, an elastomer excellent in oil absorbing power, and an organic peroxide to a polypropylene resin and kneading the obtained mixture.

In one form, the organic peroxide is added during the process in an amount of 0.02 to 5.0% by weight based on the thermoplastic elastomer composition and the kneading is conducted at a temperature of 120 to 250° C.

In another form of the invention, a process for the preparation of a thermoplastic elastomer composition includes the steps of adding a hydrogenated styrene/butadiene rubber, a process oil, an elastomer excellent in oil absorbing power and an organic peroxide to a polypropylene resin at such a mixing ratio that the weight ratio of the polypropylene resin to the hydrogenated styrene/butadiene rubber lies between 80:20 and 20:80, the amount of the elastomer excellent in oil-absorbing power is 20 to 250 parts by weight per 100 parts by weight of the hydrogenated styrene/butadiene rubber, and the amount of the process oil is 5 to 200 parts by weight of the elastomer excellent in oil absorbing power; kneading and pelletizing the obtained mixture as it is heated; and pulverizing the obtained pellets either at ambient temperature or in a frozen state. The kneading may be conducted at a temperature of 120 to 250° C.

DETAILED DESCRIPTION OF THE PREFERRED EMBODIMENT

In one form of the invention, a thermoplastic elastomer composition is made up of a polypropylene resin, a hydrogenated styrene/butadiene rubber, a process oil, and an elastomer excellent in oil absorbing power.

The polypropylene resin to be used in the present invention is selected from among homopolymers of polypropylene and block and random copolymers thereof with α-olefins. For the greatest flexibility of the molding, it is preferable to use a block or random copolymer wherein the α-olefin is ethylene. Also, the polypropylene resin must exhibit a melt flow rate (MFR) of 20 g/10 min or higher as determined according to JIS K 7210 at 230° C. under a load of 2.16 kgf. A property of the above polypropylene resins is that their backbone may be cleaved by heat or through oxidation. This is in contrast with polyethylene which becomes cross-linked or cured by heat or through oxidation. Thus, the molecular weight of polypropylene resins may be lowered in the thermoplastic elastomer composition through the addition of, for example, an organic peroxide.

A hydrogenated styrene butadiene rubber (H-SBR) is used because of its excellent compatibility with the polypropylene resin. A thermoplastic elastomer composition prepared with both is flexible enough that little whitening appears when bending the material. The styrene content of the hydrogenated styrene/butadiene rubber to be used is preferably no more than 30% by weight, and a content of 5 to 15% by weight is preferred to form a flexible skin.

The mixing ratio of the polypropylene resin to H-SBR ranges from 80:20 to 20:80 by weight. When the amount of the resin is too large, the resulting molded skin will be too hard. If the resin amount is too small, the skin will have poor tensile strength.

The composition also contains a process oil which is absorbed into the elastomer components of the composition. This serves to lower the melt viscosity of the composition and makes it possible to produce a soft, flexible skin. The process oil may be any of those used conventionally for rubbers, including paraffin oils, naphthene oils and aromatic oils, with paraffin oils being preferable because of their compatibility with the elastomer components. The addition amount of the process oil is ideally 5 to 200 parts by weight per 100 parts by weight of elastomer excellent in oil absorbing power. When the proportion exceeds 200 parts by weight, the tensile properties may be poor. When it is less than 5 parts by weight, the resulting composition may not have a sufficiently lowered melt viscosity and the skin formed may be overly hard.

The elastomer excellent in oil absorbing power must be compatible with the polypropylene resin and have the property of absorbing the process oil and the oligomeric component contained in the composition. Examples of such an elastomer include styrenic block copolymer type thermoplastic elastomers such as styrene/ethylene/butylene/styrene block copolymers (SEBS), styrene/ethylene/propylene/styrene block copolymers (SEPS), crystalline olefin/ethylene/butylene/crystalline olefin block copolymers (CEBC), ethylene/propylene rubbers (EPR), and ethylene/octene copolymers (POE).

SEBS is a product of hydrogenation of a styrene/butadiene/styrene block copolymer (SBS), and commercially available examples thereof include CLAYTON G™ series (products of Shell Chemical) and TUFTEC E™ series (products of Asahi Chemical Industry). SEBS has a property that as the styrene content increases, the strength is enhanced and the flexibility decreases. Furthermore, in slush molding, molten SEBS tends to cause the aggregation of styrene hard segments and fails to form a smooth, sheet-like product. It is therefore preferable that the styrene content be no more than 40% by weight in elastomers of this type.

SEPS is a product of the hydrogenation of a styrene/isoprene/styrene block copolymer (SIS), and a representative commercially available example thereof is SEPTON™ (a product of Kuraray). SEPS, like SEBS, lowers in flexibility as its styrene content increases, so that the styrene content of SEPS is also preferably no more than 40% by weight.

If a thermoplastic elastomer composition with H-SBR does not contain an elastomer excellent in oil absorbing power, it will be sticky because the oligomeric component contained in the composition bleeds to the surface because of the poor oil absorbing power of H-SBR. Therefore, a powdery material for powder slush molding prepared by pulverizing this composition is also sticky and has poor fluidity. It is difficult to remove a skin formed made from this material from a mold. The present invention solves this problem by providing an elastomer to absorb the oil.

The amount of the above elastomer excellent in oil absorbing power present in the composition is 20 to 250 parts by weight per 100 parts by weight of the H-SBR. When the amount is less than 20 parts by weight, the oligomeric component and the oil contained in the composition may not be sufficiently absorbed. If the amount exceeds 250 parts by weight, the dispersion of the elastomer in the propylene resin may be inadequate and result in a skin with poor tensile properties.

An organic peroxide may also be added to the composition. It may be any one conventionally used in the cross-linking of resins or rubbers. Examples include diacyl peroxides, peroxy esters, diallyl peroxide, di-t-butyl peroxide, t-butyl cumyl peroxide, dicumyl peroxide, 2,5-dimethyl-2,5-di(t-butylperoxy)hexane-3,1,3-bis(t-butylperoxyisopropyl)benzene, and 1,1-dibutylperoxy-3,3,5-trimethylcyclohexane. It is preferable that the organic peroxide exhibit a one minute half-life temperature of 150 to 250° C. in thermal decomposition.

The organic peroxide causes the cleavage of the polypropylene resin backbone when kneading at a temperature of 120 to 250° C. This lowers the molecular weight of the resin and thus enhances the melt flow properties of the thermoplastic elastomer composition. The organic peroxide is added in an amount of 0.02 to 5.0% by weight based on the thermoplastic elastomer composition. When the amount is less than this range, excellent melt flow properties may not result because the resin backbone may not be effectively cleaved. If the amount exceeds this range, excessive decomposition may occur and result in a molded article which is poor in mechanical characteristics such as tensile strength.

The inventive composition may also contain conventional heat stabilizers for polyolefins. A combination of a phenolic antioxidant with a phosphite antioxidant is generally used, though the heat stabilizer to be used in the present invention is not particularly limited.

Furthermore, the composition may contain a light stabilizer, and examples thereof include hindered amines and bensotriazoles serving as radical scavengers. The composition may also contain a pigment selected from among ordinary organic and inorganic pigments suitable for olefins. If necessary, the composition may also include a lubricant selected from among metal salts of fatty acids, and/or a filler such as calcium carbonate or talc.

The mixing of the above components is accomplished by dry blending a polypropylene resin, H-SBR, an elastomer excellent in oil absorbing power, a pigment, a stabilizer and a lubricant together in a twin cylinder mixer, tumbler, Henschel mixer, or the like. The obtained blend is then fed into a twin screw extruder through a feed hopper while pouring in a process oil through a vent hole. An extruder then melt-kneads the composition at a temperature of 120 to 250° C. and the extrusion is pelletized.

If an organic peroxide is added, mixing is accomplished in a similar manner except that a filler is also added. Alternatively, the mixing of the components in this case can also be conducted by kneading the elastomer components (i.e., H-SBR and an elastomer excellent in oil absorbing power) with a process oil using a kneader or Banbury mixer; pelletizing the obtained mixture; adding a polypropylene resin, an organic peroxide and the other components to the obtained pellets; and conducting melt-kneading and pelletization of the resulting mixture by the use of a single or twin screw extruder at a temperature of 120 to 250° C.

The addition of a heat stabilizer and/or light stabilizer is necessitated depending on the field of application of the resulting power-molded article. These stabilizers, however, hinder the decomposition of the polypropylene resin by the organic peroxide. It is therefore preferable to mix and knead these stabilizers with the other components by the use of an extruder only after the above pelletization.

It is preferable that the pellets exhibit a melt flow rate (MFR) of 5 g/10 min or higher as determined according to JIS K7210 at 250° C. under a load of 0.325 kgf. When the MFR is less than this value, the resulting composition may be poor in melt flow properties and may result in a skin having pinholes therein.

An impact mill such as a turbo mill, pin mill or hammer mill then pulverizes the pellets. This is generally conducted after the pellets are frozen with liquid nitrogen. When the pulverization is conducted at ambient temperature, only a coarse powder is obtained in some cases due to stringing.

The powder thus obtained is screened to collect particles passing through at least a sieve of 1000 $\mu$m and having a mean diameter of 100 to 800 $\mu$m, and an organic or inorganic powder improver is added to the collected particles, followed by mixing.

Powder slush molding is then conducted by the use of the powdery elastomer composition prepared above. In this molding, the powdery composition is thrown mainly by gravity into a mold heated at a temperature equal to or exceeding the melting point of the composition. After the lapse of a predetermined time, the mold is inverted to recover excessive powder into a box. A layer of the composition adhering to the surface of the mold is progressively made molten to form a skin layer. The mold is cooled and the skin layer is removed from the mold.

The mold is heated generally either by oil circulation or by placing it in a hot air oven. When the formed method is employed, the mold temperature can easily be controlled by regulating the arrangement of pipes, but the heating is limited only to the mold side. On the other hand, the use of a hot air oven makes it possible to heat the skin from both the mold side and the back side of the skin. However, hot air of 300° C. or above is generally used, so the conditions must be selected so as not to cause the degradation of the back of the skin through thermal oxidation.

The present invention will now be described in more detail by reference to the following examples.

INVENTIVE COMPOSITIONS 1–5

The materials listed in Table 1, except the process oil, were dry-blended together in a tumbler. The obtained blends were fed into a twin screw extruder through a feed hopper while the process oil was inserted through a vent hole. The materials were extruded at 200° C. and pelletized. The obtained pellets were immersed in liquid nitrogen, thrown into a turbo mill and pulverized. The obtained powders were screened to collect only particles passing through a sieve of 1000 $\mu$m.

TABLE 1

| | Parts by weight | | | | |
|---|---|---|---|---|---|
| Component | Composition 1 | Composition 2 | Composition 3 | Composition 4 | Composition 5 |
| polypropylene resin[1] | 56 | 56 | 56 | 56 | 56 |
| H-SBR[2] | 19 | 19 | 19 | 19 | 19 |
| SEPS[3] | 9 | — | — | — | 8 |
| SEBS[4] | — | 9 | — | — | — |
| CEBC[5] | — | — | 9 | — | — |
| EPR[6] | — | — | — | 9 | — |
| process oil[7] | 12 | 12 | 12 | 12 | 15 |
| pigment | 4 | 4 | 4 | 4 | 4 |
| Ca stearate | 0.5 | 0.5 | 0.5 | 0.5 | 0.5 |
| phenolic antioxidant | 0.1 | 0.1 | 0.1 | 0.1 | 0.1 |
| phosphite antioxidant | 0.1 | 0.1 | 0.1 | 0.1 | 0.1 |

[1]CHISSO POLYPRO K7750 ™ (a product of Chisso Corp.), MFR (230° C., 2.16 kgf): 45 g/10 min
[2]DYNARON 1320P ™ (a product of Japan Synthetic Rubber), styrene content: 10 wt %, MFR (230° C., 2.16 kgf): 3.5 g/10 min
[3]Styrene/ethylene/propylene/styrene block copolymer (SEPS), SEPTON 2063 ™ (a product of KURARAY), styrene content: 13 wt %, MFR (230° C., 2.16 kgf): 7 g/10 min
[4]Styrene/ethylene/butylene/styrene block copolymer (SEBS), TUFTEC H1052 ™ (a product of Asahi Chemical Industry), styrene content: 20 wt %, MFR (230° C., 2.16 kgf): 12 g/10 min
[5]Crystalline olefin/ethylene/butylene/crystalline olefin (CEBC), DYNARON 6200P ™ (a product of Japan Synthetic Rubber), MFR(230° C., 2.16 kgf): 2.5 g/10 min
[6]Ethylene/propylene rubber (EPR), EP914P ™ (a product of Japan Synthetic Rubber), propylene content: 22 wt %, MFR(230° C., 2.16 kgf): 8.6 g/10 min
[7]DIANA ™ Process Oil (a product of IDEMITSU KOSAN), PW: 380

Powder slush molding was carried out using the above compositions. A leather-grained plate (150 mm×150 mm×3 mm) was heated to 250° C. in an oven. 800 g of a composition was spread thereon and made to adhere to the plate by allowing a time period of 10 minutes. Any material not adhering was removed. The resulting plate was oven-heated at 300° C. for 60 seconds, removed from the oven, and cooled with water. Finally, a skin with a thickness of 0.8 mm was removed from the plate.

For each example, the melt viscosity of the pellets, the tensile properties of the skin, releasability from the mold, and powderiness were all evaluated by the following methods. The melt viscosity was evaluated by determining the MFR of the pellets according to JIS K7210 at 250° C. under a load of 0.325 kgf. The tensile properties were evaluated by punching a specimen out of each skin using a JIS No.3 dumbbell die and determining the tensile strength and elongation of each specimen at a pulling rate of 200 mm/min. The releasability from the mold was evaluated by heating a bastard cut file having a thickness of 3 mm, a width of 17 mm, and a length of 180 mm to 250° C. in an oven, and forming a skin thereon with each composition. The formed skin was peeled at a rate of 500 mm/min to determine the force necessary for peeling. The powderiness was evaluated by adding a powderiness improver to each composition and determining the angle of repose of the resulting mixture by the use of a powder tester (mfd. by Horikawa Micron).

The results of these tests are given in Table 2, below.

TABLE 2

| Property | Example 1 | Example 2 | Example 3 | Example 4 | Example 5 |
|---|---|---|---|---|---|
| MFR(250° C., 0.325 kgf) | 7.8 | 10.5 | 7.1 | 6.7 | 9.6 |
| Tensile Strength (N/cm$^2$) | 965 | 957 | 972 | 826 | 813 |
| Elongation(%) | 683 | 680 | 691 | 589 | 572 |
| JIS A Hardness | 86 | 87 | 86 | 86 | 83 |
| Mold Release Test(N) | 4.9 | 4.6 | 4.8 | 4.2 | 4.6 |
| Angle of repose of powder (°) | 37 | 38 | 38 | 39 | 39 |

COMPARATIVE COMPOSITIONS 6–8

Compositions 6–8 were prepared and evaluated in the same manner as that of Composition 1 except that the elastomer excellent in oil absorbing power and the process oil were not used. The compositions are detailed in Table 3 and the results are given in Table 4, both of which appear below.

TABLE 3

| | Parts by weight | | |
|---|---|---|---|
| Component | Composition 6 | Composition 7 | Composition 8 |
| polypropylene resin[8] | 56 | 56 | 56 |
| H-SBR[9] | 28 | 48 | 9 |
| SEPS[10] | — | — | 19 |
| SEBS[11] | — | 9 | — |
| CEBC[12] | — | — | — |
| EPR[13] | — | — | — |
| process oil[14] | 12 | — | — |
| pigment | 4 | 4 | 4 |
| Ca stearate | 0.5 | 0.5 | 0.5 |
| phenolic antioxidant | 0.1 | 0.1 | 0.1 |
| phosphite antioxidant | 0.1 | 0.1 | 0.1 |

[8]CHISSO POLYPRO K7750 ™ (a product of Chisso Corp.), MFR (230° C., 2.16 kgf): 45 g/10 min
[9]DYNARON 1320P ™ (a product of Japan Synthetic Rubber), styrene content: 10 wt %, MFR (230° C., 2.16 kgf): 3.5 g/10 min
[10]Styrene/ethylene/propylene/styrene block copolymer (SEPS), SEPTON 2063 ™ (a product of KURARAY), styrene content: 13 wt %, MFR (230° C., 2.16 kgf): 7 g/10 min
[11]Styrene/ethylene/butylene/styrene block copolymer (SEBS), TUFTEC H1052 ™ (a product of Asahi Chemical Industry), styrene content: 20 wt %, MFR (230° C., 2.16 kgf): 12 g/10 min
[12]Crystalline olefin/ethylene/butylene/crystalline olefin (CEBC), DYNARON 6200P ™ (a product of Japan Synthetic Rubber), MFR (230° C., 2.16 kgf): 2.5 g/10 min
[13]Ethylene/propylene rubber (EPR), EP914P ™ (a product of Japan Synthetic Rubber), propylene content: 22 wt %, MFR (230° C., 2.16 kgf): 8.6 g/10 min
[14]DIANA ™ Process Oil (a product of IDEMITSU KOSAN), PW: 380

TABLE 4

| Property | Composition 6 | Composition 7 | Composition 8 |
|---|---|---|---|
| MFR (250° C., 0.325 kgf) | 7.0 | 2.8 | 3.7 |
| Tensile Strength (N/cm$^2$) | 982 | 1035 | 626 |
| Elongation (%) | 653 | 717 | 513 |
| JIS A Hardness | 84 | 89 | 90 |
| Mold Release Test (N) | 6.8 | 13.4 | 10.3 |
| Angle of repose of powder (°) | 42 | 40 | 35 |

In comparative Composition 6, the powdery composition had a large angle of repose and was quite sticky, resulting in a skin with many pinholes. In comparative Composition 7, the skin was hard and also had pinholes due to the poor melt flow properties. Furthermore, in comparative Composition 8, the dispersed SEPS particles were too large to form a skin with satisfactory tensile properties.

On the contrary, inventive Compositions 1–5 showed no pinholing due to enhanced melt flow and lowered stickiness as compared with comparative Compositions 6–8. Also, the peel forces observed in inventive Compositions 1–5 were smaller than those of comparative Compositions 6–8.

INVENTIVE COMPOSITIONS 9–12

In a manner similar to that used for Compositions 1–5, the materials listed in Table 5, below, except the process oil, were dry-blended together in a tumbler. Obtained blends were fed into a twin screw extruder through a feed hopper while the process oil was inserted through a vent hole. The materials were extruded at 200° C. and pelletized. Then, the obtained pellets were immersed in liquid nitrogen, thrown into a turbo mill, and pulverized. Obtained powders were screened to collect only particles passing through a sieve of 1000 μm.

TABLE 5

| | parts by weight | | | |
|---|---|---|---|---|
| Component | Composition 9 | Composition 10 | Composition 11 | Composition 12 |
| polypropylene resin[15] | 56 | 51 | 56 | 51 |
| H-SBR[16] | 13 | 14 | 13 | 14 |
| POE[17] | 15 | 23 | — | — |
| EPR[18] | — | — | 15 | 23 |
| process oil[19] | 12 | 8 | 12 | 8 |
| pigment | 4 | 4 | 4 | 4 |
| Ca stearate | 0.5 | 0.5 | 0.5 | 0.5 |
| phenolic antioxidant | 0.1 | 0.1 | 0.1 | 0.1 |
| phosphite antioxidant | 0.1 | 0.1 | 0.1 | 0.1 |

[15]CHISSO POLYPRO XK0286 ™ (a product of Chisso Corp.), MFR (230° C., 2.16 kgf): 27 g/10 min
[16]DYNARON 1320P ™ ™ (a product of Japan Synthetic Rubber), styrene content: 10 wt %, MFR (230° C., 2.16 kgf): 3.5 g/10 min
[17]ENGAGE EG8400 ™ (a product of DuPont Dow Elastomers L.L.C.), MFR (230° C., 2.16 kgf): 30 g/10 min, octene content: 24 wt %.
[18]Ethylene/propylene rubber (EPR), EP914 ™ (a product of Japan Synthetic Rubber), propylene content: 22 wt %, MFR (230° C., 2.16 kgf): 8.6 g/10 min
[19]DIANA ™ Process Oil (a product of IDEMITSU KOSAN), PW: 380

In a manner similar to that used for inventive Compositions 1–5, powder slush molding was conducted using Compositions 9–12 to form skins having a thickness of about 0.8 mm. Evaluation of the pellet melt viscosity, skin tensile properties, skin releasability from the mold, and powderiness were performed. The results are given in Table 6, below.

TABLE 6

| Property | Composition 9 | Composition 10 | Composition 11 | Composition 12 |
|---|---|---|---|---|
| MFR (250° C., 0.325 kgf) | 8.1 | 5.8 | 7.3 | 5.1 |
| Tensile Strength (N/cm²) | 1124 | 985 | 1012 | 871 |
| JIS A Hardness | 87 | 86 | 86 | 85 |
| Mold Release Test (N) | 4.2 | 4.9 | 4.3 | 5.0 |
| Angle of repose of powder (°) | 38 | 37 | 38 | 39 |

It can be understood from these results that the powdery compositions exhibit excellent melt flow and low stickiness, giving pinhole-free skins. These characteristics also ensure smaller peeling forces for removing the skins from the molds.

INVENTIVE COMPOSITIONS 13–15

The materials listed below in Table 7, with the exception of the stabilizers, calcium stearate and the process oil, were blended together in a tumbler. The obtained blend was fed into a twin screw extruder through a feed hopper, while the process oil was delivered to the extruder through a vent hole. The materials were kneaded and extruded at 200° C. and pelletized. The obtained pellets were then immersed in liquid nitrogen, thrown into a turbo mill, and pulverized therein. The obtained powder was screened to collect only particles passing through a sieve of 1000 μm.

TABLE 7

| Component | Composition 13 | Composition 14 | Composition 15 | Composition 16 | Composition 17 | Composition 18 |
|---|---|---|---|---|---|---|
| | parts by weight | | | | | |
| polypropylene resin[20] | 56 | 56 | 56 | 56 | 56 | 56 |
| H-SBR[21] | 19 | 19 | 19 | 19 | 19 | 19 |
| POE[22] | 9 | 9 | — | — | 9 | — |
| EPR[23] | — | — | 9 | 9 | — | 9 |
| process oil[24] | 12 | 12 | 12 | 12 | 12 | 12 |
| organic peroxide[25] | 0.1 | 0.3 | 0.3 | 0.4 | — | — |
| pigment | 4 | 4 | 4 | 4 | 4 | 4 |
| Ca stearate | 0.5 | 0.5 | 0.5 | 0.5 | 0.5 | 0.5 |
| phenolic antioxidant | 0.1 | 0.1 | 0.1 | 0.2 | 0.1 | 0.1 |
| phosphite antioxidant | 0.1 | 0.1 | 0.1 | 0.2 | 0.1 | 0.1 |

[20]CHISSO POLYPRO K7750 ™ (a product of Chisso Corp.), MFR (230° C., 2.16 kgf): 45 g/10 min
[21]DYNARON 1320P ™ (a product of Japan Synthetic Rubber), styrene content: 10 wt %, MFR (230° C., 2.16 kgf): 3.5 g/10 min
[22]Styrene/ethylene/propylene/styrene block copolymer (SEPS), SEPTON 2063 ™ (a product of KURARAY), styrene content: 13 wt %, MFR (230° C., 2.16 kgf): 7 g/10 min
[23]Ethylene/propylene rubber (EPR), EP914P ™(a product of Japan Synthetic Rubber), propylene content: 22 wt %, MFR(230° C., 2.16 kgf): 8.6 g/10 min
[24]DIANA ™ Process Oil (a product of IDEMITSU KOSAN), PW: 380
[25]Perhexa 25B-40 ™(a product of Nippon Oil and Fats Co., Ltd.), peroxide content: 40%, one-minute half-life temperature: 179° C.

Powder slush molding was conducted using the above compositions. A leather-grained plate (150 mm×150 mm×3 mm) was heated to 250° C. in an oven. 800 g of a composition was spread thereon and made to adhere to the plate by allowing a time period of 10 minutes. Any material not adhering was removed. The resulting plate was oven heated at 300° C. for 60 seconds, removed from the oven, and cooled with water. Finally, a skin with a thickness of 0.8 mm was removed from the plate.

For each example, the melt viscosity of the pellets and the tensile properties of the skin were evaluated by the following methods. The melt viscosity was evaluated by determining the MFR of the pellets according to JIS K7210 at 250° C. under a load of 0.325 kgf. The tensile properties were evaluated by punching a specimen out of each skin using a JIS No.3 dumbbell die and determining the tensile strength and elongation of each specimen at a pulling rate of 200 mm/min.

The results of these tests are given in Table 8, below.

TABLE 8

| Property | Composition 13 | Composition 14 | Composition 15 | Composition 16 | Composition 17 | Composition 18 |
|---|---|---|---|---|---|---|
| MFR(250° C., 0.325 kgf) | 10.3 | 20.4 | 19.5 | 16.5 | 7.8 | 6.7 |
| Tensile Strength (N/cm$^2$) | 950 | 937 | 803 | 962 | 965 | 826 |
| Elongation (%) | 575 | 625 | 572 | 619 | 683 | 589 |
| JIS A Hardness | 85 | 83 | 85 | 85 | 86 | 86 |

INVENTIVE COMPOSITION 16

The materials, except the process oil, were blended together in a tumbler. The obtained blend was fed into a twin screw extruder through a feed hopper, while the process oil entered the extruder through a vent hole. The materials were kneaded and extruded at 200° C. and pelletized. Then, the obtained pellets were subjected to pulverization and powder molding viscosity and tensile properties were determined in a manner similar to that used for Compositions 13–15.

The results of these tests are given in Table 8.

COMPARATIVE COMPOSITIONS 17 AND 18

The materials were kneaded and pelletized in the same manner as that used for Compositions 13–16, except that no organic peroxide was used. The obtained pellets were subjected to pulverization and power molding. Melt viscosity and tensile properties were determined.

The results of these tests are given in Table 8, above.

It is apparent from the testing of Compositions 13–18 that the melt flow properties are superior in cases where an organic peroxide is used, with the other desirable tensile characteristics remaining unchanged.

The foregoing disclosure of specific embodiments is intended to be illustrative of the broad concepts comprehended by the invention.

We claim:

1. A thermoplastic elastomer composition for powder slush molding, said composition comprising:
    a polypropylene resin,
    a hydrogenated styrene/butadiene rubber,
    a process oil, and
    an elastomer excellent in oil absorbing power selected from the group consisting of styrene/ethylene/propylene/styrene block copolymers, styrene/ethylene/ butylene/styrene block copolymers, and crystalline olefin/ethylene/butylene/crystalline olefin block copolymers.

2. The thermoplastic elastomer composition according to claim 1 wherein the composition has a melt flow rate (MFR) of at least 5 g/10 min as determined according to JIS K-7210 at 250° C. under a load of 0.325 kgf.

3. The thermoplastic elastomer composition according to claim 1 wherein the weight ratio of the polypropylene resin to the hydrogenated styrene/butadiene rubber is between 80:20 and 20:80.

4. The thermoplastic elastomer composition according to claim 1 wherein the elastomer excellent in oil absorbing power is present in an amount of 20 to 250 parts by weight per 100 parts by weight of the hydrogenated styrene/butadiene rubber.

5. The thermoplastic elastomer composition according to claim 1 wherein the process oil is present in an amount of 5 to 200 parts by weight per 100 parts by weight of the elastomer excellent in oil absorbing power.

6. The thermoplastic elastomer composition according to claim 1 including one or more of a heat stabilizer, light stabilizer, pigment, lubricant, and filler.

7. The thermoplastic elastomer composition according to claim 6 wherein the heat stabilizer is a combination of a phenolic antioxidant with a phosphite antioxidant.

8. The thermoplastic elastomer composition according to claim 6 wherein the light stabilizer is one of a hindered amine and a bensotriazole.

9. The thermoplastic elastomer composition according to claim 6 wherein the pigment is one of an organic and inorganic pigment suitable for use with olefins.

10. The thermoplastic elastomer composition according to claim 6 wherein the lubricant is a metal salt of a fatty acid.

11. The thermoplastic elastomer composition according to claim 6 wherein the filler is one of calcium carbonate and talc.

12. A process for the preparation of a thermoplastic elastomer composition for powder molding, said process including the steps of:

adding at least a hydrogenated styrene/butadiene rubber, a process oil, and an elastomer excellent in oil absorbing power selected from the group consisting of styrene/ethylene/propylene/styrene block copolymers, styrene/ethylene/butylene/styrene block copolymers, and crystalline olefin/ethylene/butylene/crystalline olefin block copolymers to a polypropylene resin to produce a mixture; and simultaneously kneading and heating the obtained mixture.

13. A process for the preparation of a thermoplastic elastomer composition for powder slush molding, said process including the steps of:

preparing a blend comprising a polypropylene resin and a hydrogenated styrene/butadiene rubber at a weight ratio in the range of 80:20 to 20:80;

adding an elastomer excellent in oil absorbing power selected from the group consisting of styrene/ethylene/propylene/styrene block copolymers, styrene/ethylene/butylene/styrene block copolymers, and crystalline olefin/ethylene/butylene/crystalline olefin block copolymers to the blend in an amount of 20 to 250 parts by weight per 100 parts by weight of the hydrogenated styrene butadiene rubber;

adding a process oil in an amount of 5 to 200 parts by weight per 100 parts by weight of the elastomer excellent in oil absorbing power to produce a mixture, kneading and pelletizing the mixture while heating; and pulverizing the obtained pellets with the obtained pellets one of a) at ambient temperature and b) in a frozen state.

14. A process for the preparation of a thermoplastic elastomer composition for powder molding, said process including the steps of:

adding at least a hydrogenated styrene/butadiene rubber, a process oil, an elastomer excellent in oil absorbing power selected from the group consisting of styrene/ethylene/propylene/styrene block copolymers, styrene/ethylene/butylene/styrene block copolymers, and crystalline olefin/ethylene/butylene/crystalline olefin block copolymers and an organic peroxide to a polypropylene resin to obtain a mixture; and simultaneously kneading and heating the obtained mixture.

15. The process for the preparation of a thermoplastic elastomer composition according to claim 14 wherein the step of adding an organic peroxide comprises the step of adding an organic peroxide selected from among diacyl peroxides, peroxy esters, diallyl peroxide, di-t-butyl peroxide, t-butyl cumyl peroxide, dicumyl peroxide, 2,5-dimethyl-2,5-di(t-butylperoxy)hexane-3,1,3-bis(t-butylperoxyisopropyl)benzene, and 1,1-dibutylperoxy-3,3,5-trimethylcyclohexane.

16. The process for the preparation of a thermoplastic elastomer composition according to claim 14 wherein the step of adding an organic peroxide comprises the step of adding an organic peroxide in an amount of 0.02 to 5% by weight.

17. The process for the preparation of a thermoplastic elastomer composition for powder molding according to claim 14 wherein the adding step comprises the step of adding the organic peroxide in an amount of 0.02 to 5.0% by weight of the thermoplastic elastomer composition.

18. The process for the preparation of a thermoplastic elastomer composition according to claim 17 wherein the step of adding an organic peroxide comprises the step of adding an organic peroxide selected from among diacyl peroxides, peroxy esters, diallyl peroxide, di-t-butyl peroxide, t-butyl cumyl peroxide, dicumyl peroxide, 2,5-dimethyl-2,5-di(t-butylperoxy)hexane-3,1,3-bis(t-butylperoxyisopropyl)benzene, and 1,1-dibutylperoxy-3,3,5-trimethylcyclohexane.

19. The process for the preparation of a thermoplastic elastomer Composition according to claim 17 wherein the step of adding an organic peroxide comprises the step of adding an organic peroxide in an amount of 0.02 to 5% by weight.

20. The process for the preparation of a thermoplastic elastomer composition for powder molding according to claim 14 wherein the kneading step comprises kneading at a temperature of 120 to 250° C.

21. A process for the preparation of a thermoplastic elastomer composition for powder slush molding, said process including the steps of:

preparing a blend comprising a polypropylene resin and a hydrogenated styrene/butadiene rubber at a weight ratio in the range of 80:20 to 20:80;

adding an elastomer excellent in oil absorbing power selected from the group consisting of styrene/ethylene/propylene/styrene block copolymers, styrene/ethylene/ butylene/styrene block copolymers, and crystalline olefin/ethylene/butylene/crystalline olefin block copolymers to the blend in an amount of 20 to 250 parts by weight per 100 parts bey weight of the hydrogenated styrene/butadiene rubber;

adding a process oil to the blend in an amount of 5 to 200 parts by weight per 100 parts by weight of the elastomer excellent in oil absorbing power;

adding an organic peroxide to the blend in an amount of 0.02 to 5.0% by weight of the thermoplastic elastomer composition;

kneading and pelletizing the resulting blend while heating; and pulverizing the obtained pellets with the obtained pellets one of a) at room temperature and b) in a frozen state.

22. The process for the preparation of a thermoplastic elastomer composition for powder molding according to claim 21 wherein the kneading step comprises kneading at a temperature of 120 to 250° C.

23. The process for the preparation of a thermoplastic elastomer composition for powder molding according to claim 16 including the step of adding one or more of a heat stabilizer, light stabilizer, pigment, lubricant, and filler.

24. The process for the preparation of a thermoplastic elastomer composition for powder molding according to claim 18 including the step of adding one or more of a heat stabilizer, light stabilizer, pigments, lubricant, and filler.

25. The process for the preparation of a thermoplastic elastomer composition for powder molding according to claim 18 including the step of adding one or more of a heat stabilizer, light stabilizer, pigment, lubricant, and filler.

26. The process for the preparation of a thermoplastic elastomer composition for powder molding according to claim 21 including the step of adding one or more of a heat stabilizer, light stabilizer, pigments, lubricant, and filler.

* * * * *